US010531119B2

(12) United States Patent
Sun et al.

(10) Patent No.: US 10,531,119 B2
(45) Date of Patent: *Jan. 7, 2020

(54) METHOD AND APPARATUS FOR PALETTE CODING WITH CROSS BLOCK PREDICTION

(71) Applicant: MediaTek Inc., Hsin-Chu (TW)

(72) Inventors: Yu-Chen Sun, Keelung (TW); Jungsun Kim, San Jose, CA (US); Tzu-Der Chuang, Zhubei (TW); Yi-Wen Chen, Taichung (TW); Wang Lin Lai, San Jose, CA (US); Shan Liu, San Jose, CA (US); Yu-Wen Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,994

(22) Filed: Nov. 29, 2018

(65) Prior Publication Data

US 2019/0110071 A1  Apr. 11, 2019

Related U.S. Application Data

(63) Continuation of application No. 15/101,139, filed as application No. PCT/CN2014/095159 on Dec. 26, 2014, now Pat. No. 10,182,242.

(Continued)

(51) Int. Cl.
*H04N 19/182* (2014.01)
*H04N 19/593* (2014.01)
(Continued)

(52) U.S. Cl.
CPC ......... *H04N 19/593* (2014.11); *H04N 19/124* (2014.11); *H04N 19/176* (2014.11); *H04N 19/182* (2014.11); *H04N 19/186* (2014.11)

(58) Field of Classification Search
CPC .. H04N 19/593; H04N 19/182; H04N 19/186; H04N 19/176; H04N 19/124
See application file for complete search history.

(56) References Cited

U.S. PATENT DOCUMENTS 7,343,037 B1   3/2008 Kadatch
7,903,873 B2   3/2011 Lu et al.
(Continued)

FOREIGN PATENT DOCUMENTS

CN   101068352 A   11/2007
CN   101217668 A   7/2008
(Continued)

OTHER PUBLICATIONS

Yu, Y., et al..; "Adaptive Scan for Large Blocks for HEVC;" Joint Collaborative Team on Video Coding (JCT-VC) of ITU-T SG16 WP3 and ISO/IEC JTC1/SC29/WG11; Jul. 2011; pp. 1-6.
(Continued)

*Primary Examiner* — Tsion B Owens
(74) *Attorney, Agent, or Firm* — McClure, Qualey & Rodack, LLP

(57) ABSTRACT

A method and apparatus for color index coding of a block of video data using index prediction based on reconstructed neighboring pixels are disclosed. In one embodiment, color index encoding or decoding is applied to the current pixel indices by deriving index prediction from neighboring pixel indices of the reconstructed neighboring pixels. The reconstructed neighboring pixel values are first transformed into the neighboring pixel indices according to a quantization table to map between major color indices and major color values of the current block. The quantization table can be based on a major color table for the current block or can also be derived at a decoder side. The decoding process may reconstruct the current pixels by converting decoded current pixel indices to reconstructed current pixel values according to the quantization table or by directly copying the reconstructed neighboring pixel values indicated by decoded current pixel indices.

23 Claims, 16 Drawing Sheets

Related U.S. Application Data

(60) Provisional application No. 62/086,319, filed on Dec. 2, 2014, provisional application No. 62/060,817, filed on Oct. 7, 2014, provisional application No. 62/040,582, filed on Aug. 22, 2014, provisional application No. 62/040,020, filed on Aug. 21, 2014, provisional application No. 62/035,625, filed on Aug. 11, 2014, provisional application No. 62/031,974, filed on Aug. 1, 2014, provisional application No. 61/924,333, filed on Jan. 7, 2014, provisional application No. 61/921,156, filed on Dec. 27, 2013.

(51) Int. Cl.
*H04N 19/124* (2014.01)
*H04N 19/176* (2014.01)
*H04N 19/186* (2014.01)

(56) References Cited

U.S. PATENT DOCUMENTS

| | | | | |
|---|---|---|---|---|
| 9,654,806 | B2* | 5/2017 | Zou | H04N 19/94 |
| 9,749,628 | B2* | 8/2017 | Chuang | H04N 19/70 |
| 2009/0074307 | A1* | 3/2009 | Lu | G06T 9/00 382/232 |
| 2009/0110305 | A1 | 4/2009 | Fenney | |
| 2009/0147855 | A1 | 6/2009 | Song et al. | |
| 2011/0135000 | A1 | 6/2011 | Alshina et al. | |
| 2013/0003837 | A1 | 1/2013 | Yu et al. | |
| 2013/0170546 | A1 | 7/2013 | Kim et al. | |
| 2013/0251046 | A1 | 9/2013 | Matsunobu et al. | |
| 2013/0272401 | A1 | 10/2013 | Seregin et al. | |
| 2013/0301734 | A1 | 11/2013 | Gisquet et al. | |
| 2014/0003531 | A1 | 1/2014 | Coban et al. | |
| 2014/0086333 | A1 | 3/2014 | Wang | |
| 2014/0105002 | A1* | 4/2014 | Pan | H04L 41/0659 370/228 |
| 2014/0241630 | A1* | 8/2014 | MacInnis | H04N 19/593 382/166 |
| 2014/0286427 | A1 | 9/2014 | Fukushima et al. | |
| 2014/0301475 | A1 | 10/2014 | Guo et al. | |
| 2015/0016501 | A1 | 1/2015 | Guo et al. | |
| 2015/0146976 | A1* | 5/2015 | Ma | H04N 1/646 382/166 |

FOREIGN PATENT DOCUMENTS

| | | |
|---|---|---|
| CN | 101340587 A | 1/2009 |
| CN | 101365136 | 2/2009 |
| CN | 101645173 | 2/2010 |
| CN | 101816177 | 8/2010 |
| CN | 103248893 A | 8/2013 |
| CN | 103392341 | 11/2013 |
| CN | 106464873 | 2/2017 |
| EP | 2 645 719 A2 | 10/2013 |
| WO | 2012/171463 A1 | 12/2012 |
| WO | 2013/046095 A1 | 4/2013 |
| WO | 2013/069216 A1 | 5/2013 |
| WO | 2012/147622 A1 | 7/2014 |
| WO | 2012/160890 A1 | 7/2014 |
| WO | 2015/179814 A1 | 11/2015 |

OTHER PUBLICATIONS

Sun, Y.C., et al.; "AHG10: A triplet palette mode combining JCTVC-P0108 and JCTVC-P0198;" Joint Collaborative Team on Video Coding (JCT-VC) of ITU-T SG16 WP3 and ISO/IEC JTC1/SC29/WG11; Mar.-Apr. 2014; pp. 1-9.

Zhu, J., et al.; "AHG10: Adaptive Scan Order on Palette Based Coding;" Joint Collaborative Team on Video Coding (JCT-VC) of ITU-T SG16 WP3 and ISO/IEC JTC1/SC29/WG11; Mar.-Apr. 2014; pp. 1-4.

Esenlik, S., et al.; "AHG4: Dependent slices restriction;" Joint Collaborative Team on Video Coding (JCT-VC) of ITU-T SG16 WP3 and ISO/IEC JTC1/SC29/WG11; Oct. 2012; pp. 1-6.

Chen, J., et al.; "Description of screen content coding technology proposal by Qualcomm;" Joint Collaborative Team on Video Coding (JCT-VC) of ITU-T SG16 WP3 and ISO/IEC JTC1/SC29/WG11; Mar.-Apr. 2014; pp. 1-19.

Misra, K., et al.; "Modifications to palette coding for tiles/slices/dependent slices/ wavefronts;" Joint Collaborative Team on Video Coding (JCT-VC) of ITU-T SG16 WP3 and ISO/IEC JTC1/SC29/WG11; Jun.-Jul. 2014; pp. 1-4.

Zhu, W., et al.; "Non-RCE3 Template-based palette prediction;" Joint Collaborative Team on Video Coding (JCT-VC) of ITU-T SG16 WP3 and ISO/IEC JTC1/SC29/WG11; Apr. 2013; pp. 1-8.

Guo, L., et al.; "Non-RCE3: Modified Palette Mode for Screen Content Coding;" Joint Collaborative Team on Video Coding (JCT-VC) of ITU-T SG16 WP3 and ISO/IEC JTC1/SC29/WG11; Jul.-Aug. 2013; pp. 1-6.

Chuang, T.D., et al.; "Non-RCE4: Four-neighbor major color index prediction;" Joint Collaborative Team on Video Coding (JCT-VC) of ITU-T SG16 WP3 and ISO/IEC JTC1/SC29/WG11; Jan. 2014; pp. 1-5.

Laroche, G., et al.; "Non-RCE4: Palette Prediction for Palette mode;" Joint Collaborative Team on Video Coding (JCT-VC) of ITU-T SG16 WP3 and ISO/IEC JTC1/SC29/WG11; Jan. 2014; pp. 1-6.

Sun, Y.C., et al.; "Non-RCE4: Removal of syntax redundancy in RCE4 Test2;" Joint Collaborative Team on Video Coding (JCT-VC) of ITU-T SG16 WP3 and ISO/IEC JTC1/SC29/WG11; Jan. 2014; pp. 1-5.

Seregin, V., et al.; "Non-SCCE3: Palette predictor resetting;" Joint Collaborative Team on Video Coding (JCT-VC) of ITU-T SG16 WP3 and ISO/IEC JTC1/SC29/WG11; Jun.-Jul. 2014; pp. 1-4.

Guo, L. et al.; "Palette Mode for Screen Content Coding;" Joint Collaborative Team on Video Coding (JCT-VC) of ITU-T SG16 WP3 and ISO/IEC JTC1/SC29/WG11; Apr. 2013; pp. 1-24.

Joshi, R., et al.; "RCE2: Summary report on HEVC Range Extensions Core Experiment 2 (RCE2) on prediction and coding techniques for transform-skip and transform-bypass blocks;" Joint Collaborative Team on Video Coding (JCT-VC) of ITU-T SG16 WP3 and ISO/IEC JTC1/SC29/WG11; Jul.-Aug. 2013; pp. 1-12.

Guo, L. et al.; "RCE3: Results of Test 3.1 on Palette Mode for Screen Content Coding;" Joint Collaborative Team on Video Coding (JCT-VC) of ITU-T SG16 WP3 and ISO/IEC JTC1/SC29/WG11; Jul.-Aug. 2013; pp. 1-7.

Sun, Y.C., et al.; "SCCE3 Test B.4: Adaptive color index map scan;" Joint Collaborative Team on Video Coding (JCT-VC) of ITU-T SG16 WP3 and ISO/IEC JTC1/SC29/WG11; Jun.-Jul. 2014; pp. 1-16.

International Search Report dated Mar. 25, 2015, issued in application No. PCT/CN2014/095159.

Guo, X., et al; "AHG8: Major-color-based screen content coding;" Joint Collaborative Team on Video Coding (JCT-VC) of ITU-T SG 16 WP 3 and ISO/IEC JTC 1/SC29/WG 11; JCTVC-O0182; Nov. 2013; pp. 1-7.

Sun, Y.C., et al.; "Non-RCE4 Cross-CU major color index prediction;" Joint Collaborative Team on Video Coding (JTC-VC) of ITU-T SG 16 WP 3 and ISO/IEC JTC 1/SC 29/WG 11; Jan. 2014; pp. 1-5.

Guo, X., et al.; "RCE4 Test 1. Major-color-based screen content coding;" Joint Collaborative Team on Video Coding (JTC-VC) of ITU-T SG 16 WP 3 and ISO/IEC JTC 1/SC 29/WG 11; Jan. 2014; pp. 1-12.

Guo, L., et al.; "Palette Mode for Screen Content Coding;" Joint Collaborative Team on Video Coding (JCT-VC) of ITU-T SG 16 WP 3 and ISO/IEC JTC 1/SC 29/WG 11; Apr. 2013; pp. 1-11.

* cited by examiner

| (20) | (21) | (22) | (23) | (201) | (203) | (204) | (205) | (205) |
|---|---|---|---|---|---|---|---|---|
| (19) | | | | | | | | |
| (19) | | | | | | | | |
| (19) | | | | | | | | |
| (18) | | | | | | | | |
| (18) | | | | | | | | |
| (18) | | | | | | | | |
| (18) | | | | | | | | |
| (18) | | | | | | | | |

Fig. 1A

| (20) 1 | (21) 1 | (22) 1 | (23) 1 | (201) 2 | (203) 2 | (204) 2 | (205) 2 | (205) 2 |
|---|---|---|---|---|---|---|---|---|
| (19) 1 | | | | | | | | |
| (19) 1 | | | | | | | | |
| (19) 1 | | | | | | | | |
| (18) 1 | | | | | | | | |
| (18) 1 | | | | | | | | |
| (18) 1 | | | | | | | | |
| (18) 1 | | | | | | | | |
| (18) 1 | | | | | | | | |

Fig. 1B

| (20) 1 | (21) 1 | (22) 1 | (23) 1 | (201) 2 | (203) 2 | (204) 2 | (205) 2 | (205) 2 |
|---|---|---|---|---|---|---|---|---|
| (19) 1 →| 1 | | | | | | | |
| (19) 1 | | | | | | | | |
| (19) 1 | | | | | | | | |
| (18) 1 | | | | | | | | |
| (18) 1 | | | | | | | | |
| (18) 1 | | | | | | | | |
| (18) 1 | | | | | | | | |
| (18) 1 | | | | | | | | |

Fig. 2A

| (20) 1 | (21) 1 | (22) 1 | (23) 1 | (201) 2 | (203) 2 | (204) 2 | (205) 2 | (205) 2 |
|---|---|---|---|---|---|---|---|---|
| (19) 1 →| (20) 1 | | | | | | | |
| (19) 1 | | | | | | | | |
| (19) 1 | | | | | | | | |
| (18) 1 | | | | | | | | |
| (18) 1 | | | | | | | | |
| (18) 1 | | | | | | | | |
| (18) 1 | | | | | | | | |
| (18) 1 | | | | | | | | |

Fig. 2B

| (20) 1 | (21) 1 | (22) 1 | (23) 1 | (201) 2 | (203) 2 | (204) 2 | (205) 2 | (205) 2 |
|---|---|---|---|---|---|---|---|---|
| (19) 1 → | (19) 1 | | | | | | | |
| (19) 1 | | | | | | | | |
| (19) 1 | | | | | | | | |
| (18) 1 | | | | | | | | |
| (18) 1 | | | | | | | | |
| (18) 1 | | | | | | | | |
| (18) 1 | | | | | | | | |
| (18) 1 | | | | | | | | |

Fig. 3A

| (20) 1 | (21) 1 | (22) 1 | (23) 1 | (201) 2 | (203) 2 | (204) 2 | (205) 2 | (205) 2 |
|---|---|---|---|---|---|---|---|---|
| (19) 1 → | (19) 1 | (22) 1 ↓ | | | | | | |
| (19) 1 | | | | | | | | |
| (19) 1 | | | | | | | | |
| (18) 1 | | | | | | | | |
| (18) 1 | | | | | | | | |
| (18) 1 | | | | | | | | |
| (18) 1 | | | | | | | | |
| (18) 1 | | | | | | | | |

Fig. 3B

| (20)1 | (21)1 | (22)1 | (23)1 | (201)2 | (203)2 | (204)2 | (205)2 | (205)2 |
|---|---|---|---|---|---|---|---|---|
| (19)1 | (19)1 | (22)1 | | | | | | |
| (19)1 | | (22)1 | | | | | | |
| (19)1 | | (22)1 | d>D | | | | | |
| (18)1 | | (22)1 | | | | | | |
| (18)1 | | (20)1 | | | | | | |
| (18)1 | | | | | | | | |
| (18)1 | | | | | | | | |
| (18)1 | | | | | | | | |

Fig. 4

| (20)1 | (21)1 | (22)1 | (23)1 | (100)3(E) | (203)2 | (204)2 | (205)2 | (205)2 |
|---|---|---|---|---|---|---|---|---|
| (19)1 | | | | | | | | |
| (19)1 | | | | | | | | |
| (19)1 | | | | | | | | |
| (18)1 | | | | | | | | |
| (18)1 | | | | | | | | |
| (18)1 | | | | | | | | |
| (18)1 | | | | | | | | |
| (18)1 | | | | | | | | |

Fig. 5A

| (20) 1 | (21) 1 | (22) 1 | (23) 1 | (100) 0 | (203) 2 | (204) 2 | (205) 2 | (205) 2 |
|---|---|---|---|---|---|---|---|---|
| (19) 1 | | | | | | | | |
| (19) 1 | | | | | | | | |
| (19) 1 | | | | | | | | |
| (18) 1 | | | | | | | | |
| (18) 1 | | | | | | | | |
| (18) 1 | | | | | | | | |
| (18) 1 | | | | | | | | |
| (18) 1 | | | | | | | | |

Fig. 5B

| (20) 1 | (21) 1 | (22) 1 | (23) 1 | (201) 2 | (203) 2 | (204) 2 | (205) 2 | (205) 2 |
|---|---|---|---|---|---|---|---|---|
| (19) 1 | 1 | 1 | 1 | 2 | 2 | 2 | 2 | 2 |
| (19) 1 | 1 | 1 | 1 | | | | | |
| (19) 1 | | | | | | | | |
| (18) 1 | | | | | | | | |
| (18) 1 | | | | | | | | |
| (18) 1 | | | | | | | | |
| (18) 1 | | | | | | | | |
| (18) 1 | | | | | | | | |

Fig. 6A

| (20)1 | (21)1 | (22)1 | (23)1 | (201)2 | (203)2 | (204)2 | (205)2 | (205)2 |
|---|---|---|---|---|---|---|---|---|
| (19)1 | (20)1 | (20)1 | (20)1 | (200)2 | (200)2 | (200)2 | (200)2 | (200)2 |
| (19)1 | (20)1 | (20)1 | (20)1 | | | | | |
| (19)1 | | | | | | | | |
| (18)1 | | | | | | | | |
| (18)1 | | | | | | | | |
| (18)1 | | | | | | | | |
| (18)1 | | | | | | | | |
| (18)1 | | | | | | | | |

Fig. 6B

| (20)1 | (21)1 | (22)1 | (23)1 | (201)2 | (203)2 | (204)2 | (205)2 | (205)2 |
|---|---|---|---|---|---|---|---|---|
| (19)1 | 1 | 1 | 1 | 2 | 2 | 2 | 2 | 2 |
| (19)1 | | | | 2 | 2 | 2 | 2 | 2 |
| (19)1 | | | | | | | | |
| (18)1 | | | | | | | | |
| (18)1 | | | | | | | | |
| (18)1 | | | | | | | | |
| (18)1 | | | | | | | | |
| (18)1 | | | | | | | | |

| (20) 1 | (21) 1 | (22) 1 | (23) 1 | (201) 2 | (203) 2 | (204) 2 | (205) 2 | (205) 2 |
|---|---|---|---|---|---|---|---|---|
| (19) 1 | 3 | 3 | | | | | | |
| (19) 1 | 3 | 3 | | | | | | |
| (19) 1 | 3 | 3 | | | | | | |
| (18) 1 | 1 | | | | | | | |
| (18) 1 | 1 | | | | | | | |
| (18) 1 | 1 | | | | | | | |
| (18) 1 | 1 | | | | | | | |
| (18) 1 | 1 | | | | | | | |

Fig. 8

| (20) 1 | (21) 1 | (22) 1 | (23) 1 | (201) 2 | (203) 2 | (204) 2 | (205) 2 | (205) 2 |
|---|---|---|---|---|---|---|---|---|
| (19) 1 | 1 | 1 | 1 | 2 | 2 | 2 | 2 | 2 |
| (301) 3 | 3 | 3 | 3 | 3 | 3 | | | |
| (201) 2 | | | | | | | | |
| (18) 1 | | | | | | | | |
| (18) 1 | | | | | | | | |
| (18) 1 | | | | | | | | |
| (18) 1 | | | | | | | | |
| (18) 1 | | | | | | | | |

Fig. 9A

| (20) 1 | (21) 1 | (22) 1 | (23) 1 | (201) 2 | (203) 2 | (204) 2 | (205) 2 | (205) 2 |
|---|---|---|---|---|---|---|---|---|
| (19) 1 | 1 | 2 | | | | | | |
| (19) 1 | 1 | 2 | | | | | | |
| (19) 1 | 1 | 2 | | | | | | |
| (18) 1 | 1 | 2 | | | | | | |
| (18) 1 | 1 | 2 | | | | | | |
| (18) 1 | 1 | | | | | | | |
| (18) 1 | 1 | | | | | | | |
| (18) 1 | 1 | | | | | | | |

Fig. 9B

| (20) 1 | (21) 1 | (202) 2 | (301) 3 | (301) 3 | (303) 3 | (304) 3 | (305) 3 | (305) 3 |
|---|---|---|---|---|---|---|---|---|
| (19) 1 | 1 | 1 | 3 | | | | | |
| (19) 1 | 1 | 1 | 3 | | | | | |
| (19) 1 | 1 | 3 | | | | | | |
| (18) 1 | 3 | | | | | | | |
| (18) 1 | | | | | | | | |
| (18) 1 | | | | | | | | |
| (18) 1 | | | | | | | | |

Fig. 10

| (20)1 | (21)1 | (22)1 | (23)1 | (201)2 | (203)2 | (204)2 | (205)2 | (205)2 |
|---|---|---|---|---|---|---|---|---|
| (19)1 | (21) | (22) | (23) | (201) | (203) | (204) | (205) | (205) |
| (301)3 | (301) | (301) | (301) | (301) | (301) | | | |
| (201)2 | | | | | | | | |
| (18)1 | | | | | | | | |
| (18)1 | | | | | | | | |
| (18)1 | | | | | | | | |
| (18)1 | | | | | | | | |
| (18)1 | | | | | | | | |

Fig. 11

| (20)1 | (21)1 | (22)1 | (23)1 | (201)2 | (203)2 | (204)2 | (205)2 | (205)2 |
|---|---|---|---|---|---|---|---|---|
| (19)1 | (19)1 | (22)1 | | | | | | |
| (301)3 | | (22)1 | | | | | | |
| (201)2 | | (22)1 | d<D | | | | | |
| (18)1 | | (22)1 | | | | | | |
| (18)1 | | (20)1 | | | | | | |
| (18)1 | | | | | | | | |
| (18)1 | | | | | | | | |
| (18)1 | | | | | | | | |

| 1 | 1 | 1 | 1 | 1 | 3 | 3 | 2 | 3 |
|---|---|---|---|---|---|---|---|---|
| 1 | 1 | 1 | 1 | 1 | 4 | 4 | 4 | 4 |
| 1 |   |   |   |   |   |   |   |   |
| 1 |   |   |   |   |   |   |   |   |
| 1 |   |   |   |   |   |   |   |   |
| 1 |   |   |   |   |   |   |   |   |
| 1 |   |   |   |   |   |   |   |   |
| 1 |   |   |   |   |   |   |   |   |
| 1 |   |   |   |   |   |   |   |   |

Fig. 14

| | | |
|---|---|---|
| K | A | A |
| K | ? | |
| | | |
Fig. 16A
| | | |
|---|---|---|
| K | A | C |
| K | ? | |
| | | |
Fig. 16B
| | | A | |
|---|---|---|---|
| A | A | ? | |
| | | | |
Fig. 17A
| | | C | |
|---|---|---|---|
| A | A | ? | |
| | | | |
Fig. 17B
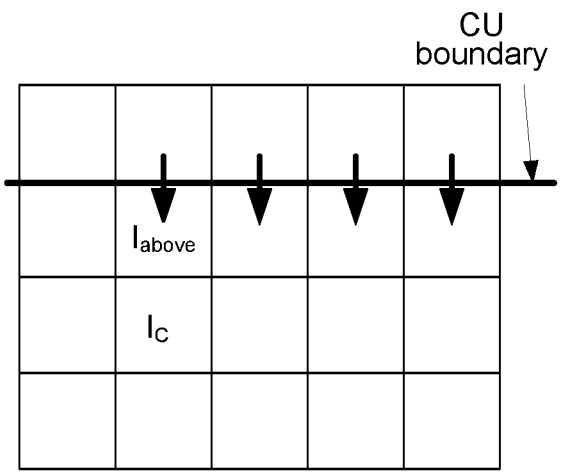
Fig. 18A
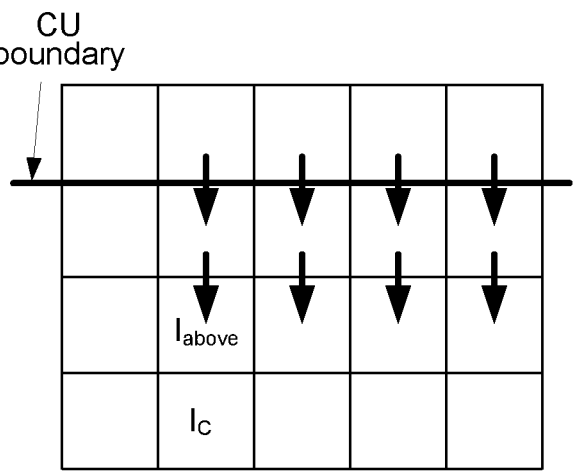
Fig. 18B

METHOD AND APPARATUS FOR PALETTE CODING WITH CROSS BLOCK PREDICTION

CROSS REFERENCE TO RELATED APPLICATIONS

The present application is a Continuation application of U.S. patent application Ser. No. 15/101,139 filed on Jun. 2, 2016, which is a National Phase of PCT/CN2014/095159, filed on Dec. 26, 2014, which claims priority to U.S. Provisional Patent Application, Ser. No. 61/921,156, filed on Dec. 27, 2013, U.S. Provisional Patent Application, Ser. No. 61/924,333, filed on Jan. 7, 2014, U.S. Provisional Patent Application, Ser. No. 62/031,974, filed on Aug. 1, 2014, U.S. Provisional Patent Application, Ser. No. 62/035,625, filed on Aug. 11, 2014, U.S. Provisional Patent Application, Ser. No. 62/040,020, filed on Aug. 21, 2014, U.S. Provisional Patent Application, Ser. No. 62/040,582, filed on Aug. 22, 2014, U.S. Provisional Patent Application, Ser. No. 62/060,817, filed on Oct. 7, 2014, and U.S Provisional Patent Application, Ser. No. 62/086,319, filed on Dec. 2, 2014. The U.S. Provisional Patent Applications are hereby incorporated by reference in their entireties.

TECHNICAL FIELD

The present invention relates to color index coding for video data. In particular, the present invention relates to techniques to improve the performance of color index coding by using Intra color index coding with cross block boundary prediction.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials.

During the early development of HEVC range extensions (RExt), several proposals have been disclosed to address palette-based coding. For example, a palette prediction and sharing technique is disclosed in JCTVC-N0247 (Guo et al., "RCE3: Results of Test 3.1 *on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247). In JCTVC-N0247, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table size is first transmitted followed by the palette elements.
2. Transmission of pixel values: the pixels in the CU are encoded in a raster scan order. For each group of one or more pixels, a flag for a run-based mode is first transmitted to indicate whether the "run" mode or "copy above" mode is being used.
   2.1 "run" mode: In the "run" mode, a palette index is first signaled followed by "palette_run" (e.g., M) representing the run value. The run value indicates that a total of M samples are all coded using "run" mode. No further information needs to be transmitted for the current position and the following M positions since they have the same palette index as that signaled in the bitstream. The palette index (e.g., i) may also be shared by all three color components, which means that the reconstructed pixel values are (Y, U, V)=(palette$_Y$[i], palette$_U$[i], palette$_V$[i]) for the case of YUV color space.
   2.2 "copy above" mode: In the "copy above" mode, a value "copy_run" (e.g., N) is transmitted to indicate that for the following N positions (including the current one), the palette index is the same as the corresponding palette index in the row above.
3. Transmission of residue: the palette indices transmitted in Stage 2 are converted back to pixel values and used as the prediction. Residue information is transmitted using HEVC residual coding and is added to the prediction for the reconstruction.

In the above approach, other than the "run" mode and the "copy above" mode, a current pixel may also be coded by "pixel" mode, where the pixel value is transmitted. Another version of the color index coding technique has also been disclosed by Guo et al., in JCTVC-N0249 (Guo et al., "*Non-RCE3: Modified Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0249), where each element in the palette is a triplet representing a specific combination of the three color components. The palette index is shared by all color components to reduce overhead.

Yet another major color-base coding (color index coding) method is disclosed by Guo et al. in JCTVC-O0182 (Guo et al., "*AHG8. Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). According to JCTVC-O0182, the palette of each component are constructed and transmitted. However, instead of predicting the entire palette from the left CU, individual entry in a palette can be predicted from the exact corresponding palette entry in the above CU or left CU.

According to JCTVC-O0182, a predictive coding method is applied on the indices for transmission of pixel values, where a pixel line can be predicted by different modes. In specific, three kinds of line modes are used for a pixel line, i.e. horizontal mode, vertical mode and normal mode. In horizontal mode, all the pixels in the same line have the same value. If the value is the same as the first pixel of the above pixel line, only line mode signaling bits are transmitted. Otherwise, the index value is also transmitted. In vertical mode, the current pixel line is the same with the above pixel line. Therefore, only line mode signaling bits are transmitted. In normal mode, pixels in a line are predicted individually. For each pixel, the left or above neighboring pixel is used as predictor, and the prediction symbol is transmitted to the decoder. Furthermore, pixels are classified into major color pixels and escape pixels. For major color pixels, the decoder reconstructs the pixel values using the major color indices and palette. For escape pixels, the encoder will further send the pixel values.

It is desirable to develop methods for further improving the coding efficiency associated with the color index coding.

SUMMARY

A method and apparatus for color index coding of a block of video data using index prediction based on reconstructed neighboring pixels are disclosed. In one embodiment, color index encoding or decoding is applied to the current pixel indices by deriving index prediction from neighboring pixel indices of the reconstructed neighboring pixels. The reconstructed neighboring pixel values are first transformed into the neighboring pixel indices according to a quantization table to map between major color indices and major color values of the current block. The quantization table can be based on a major color table for the current block. The quantization table can also be derived at a decoder side. In one embodiment, every neighboring pixel value of the reconstructed neighboring pixels is transformed into one major color index in the quantization table so that no escape is used for the mapping. The decoding process may reconstruct the current pixels by converting decoded current pixel indices to reconstructed current pixel values according to the quantization table. Alternatively, the decoding process may reconstruct the current pixels by directly copying the reconstructed neighboring pixel values.

The reconstructed neighboring pixels may correspond to previously coded or reconstructed spatial and/or temporal neighboring pixels. Various simplification methods for mapping reconstructed neighboring pixel values to neighboring pixel indices are disclosed. In one embodiment, index 0 is assigned to a given reconstructed neighboring pixel value if no match can be found between the given reconstructed neighboring pixel value and any major color value in the quantization table. In another embodiment, a given reconstructed neighboring pixel value is evaluated against a partial set of the major color indices in the quantization table to identify a matched major color index as a selected neighboring pixel index. In yet another embodiment, a given reconstructed neighboring pixel value is evaluated against a partial set of color components associated with the major color indices to identify a matched major color index as a selected neighboring pixel index.

Various criteria can be used to select an index for the neighboring pixel. In one embodiment, a given reconstructed neighboring pixel value is evaluated against all major color indices in the quantization table, and a matched major color index is identified as a selected neighboring pixel index if the given reconstructed neighboring pixel value has a minimum difference with the major color value corresponding to the matched major color index among all major color values. In another embodiment, a matched major color index is identified as a selected neighboring pixel index if a difference between the given reconstructed neighboring pixel value and the major color value corresponding to the matched major color index is smaller than a threshold. In yet another embodiment, if more than one matched major color index is identified, the matched major color index identified the earliest is used as the selected neighboring pixel index.

The first current pixel in each current row of the current block can be predicted based on a left reconstructed neighboring pixel. If a selected current pixel is not adjacent to any above reconstructed neighboring pixel or any left reconstructed neighboring pixel, the selected current pixel can be predicted by the above reconstructed neighboring pixel in a same column or the left reconstructed neighboring pixel in a same row. In another embodiment, if a selected current pixel use copy-above-run mode, the selected current pixel can be predicted by the above reconstructed neighboring pixel's reconstructed pixel value. If a selected current pixel has no reconstructed neighboring pixel available for the index prediction, an index prediction mode can be used to indicate an index mode being used to signal a new index for the selected current pixel. In one embodiment, for the current pixels in a first row of the current block, if a previous prediction mode of a given current pixel is a copy-above-run mode, the copy-above-run mode is redundant and is excluded from candidate prediction modes for the current pixel. The reconstructed neighboring pixels may include one or more rows of the reconstructed neighboring pixels above the current block. If a prediction copy mode is used for a selected current pixel and a corresponding predictor has an escape mode, the selected current pixel can be decoded to have an escape index associated with the corresponding predictor. Furthermore, if the corresponding predictor is within the reconstructed neighboring pixels, the selected current pixel can be decoded by copying the reconstructed neighboring pixel value of the corresponding predictor. In another embodiment, if a selected current pixel uses the copy-above-run mode, the selected current pixel can be decoded by copying the reconstructed neighboring pixel value of the corresponding predictor.

BRIEF DESCRIPTION OF DRAWINGS

FIGS. 1A-1B illustrate an example of converting color values of neighboring pixels to color indices according to the color index table of Table 1, where the neighboring pixel values in FIG. 1A are converted to neighboring pixel indices in FIG. 1B.

FIGS. 2A-2B illustrate an example of color index prediction using reconstructed neighboring pixels, where the color index of the first pixel is predicted by the left neighboring pixel as shown in FIG. 2A and the pixel is decoded as 20 based on a major color table as shown in FIG. 2B.

FIG. 3A illustrates an example of color index prediction using reconstructed neighboring pixels, where the first pixel is reconstructed using the reconstructed pixel value of the neighboring pixel on the left.

FIG. 3B illustrates a further example of color index prediction using reconstructed neighboring pixels, where the second pixel is reconstructed using the reconstructed pixel value of the neighboring pixel from above.

FIG. 4 illustrates an example of index prediction by propagating the predictor based on the neighboring pixel, where the reconstructed neighboring pixel value or the major color value corresponding to the color index of the predictor is used as the reconstructed pixel value of the current pixel.

FIG. 5A illustrates an example of transforming a neighboring pixel index to an escape index.

FIG. 5B illustrates an example of transforming a neighboring pixel index to a predefine value.

FIG. 6A illustrates an example of horizontal scanning for index prediction.

FIG. 6B illustrates an example of reconstructed pixel values based on the horizontal scanning and a major color table.

FIG. 7A illustrates an example of an alternating horizontal scanning for index prediction.

FIG. 7B illustrates an example of vertical scanning for index prediction.

FIG. 7C illustrates an example of diagonal scanning for index prediction.

FIG. 8 illustrates an example of vertical scanning for index prediction, where the starting position is after the first three pixels.

FIGS. 9A-9B illustrate examples of index prediction based on neighboring pixels from above or from left regardless of scanning direction, where FIG. 9A corresponds to horizontal scanning, FIG. 9B corresponds to vertical scanning.

FIG. 10 illustrate another example of index prediction based on neighboring pixels from above or from left regardless of scanning direction, where the scanning direction corresponds to diagonal scanning.

FIG. 11 illustrates an example of index prediction based on neighboring pixels and previous coded pixels, where the reconstructed pixel values are copied from reconstructed pixel values of the corresponding predictors.

FIG. 12 illustrates an example of index prediction based on neighboring pixels, where the first pixel in the first row is predicted by the left neighboring pixel, the second pixel in the first row is predicted by the above neighboring pixel, and the subsequent 4 pixels below the second pixel in the first row are predicted using predictor propagation.

FIG. 13A illustrates an example of entropy coding for color index coding, where the proceeding 4 pixels of a current pixel are predicted from the above line, and the current index references to the index of above pixel.

FIG. 13B illustrates another example of entropy coding for color index coding, where the proceeding 4 pixels of a current pixel are predicted from the above line, and the current index is predicted by the neighboring pixel in the same column using predictor propagation.

FIG. 14 illustrates an example of entropy coding for index coding, where the current pixel is located in the first line of the current block and the proceeding pixels are predicted as the copy from above mode, the current pixel requires the index of above pixel to be code/decoded, and the pixel value may be unknown in the parsing stage.

FIG. 16A illustrates an example of redundant index for index prediction, where the preceding pixels are coded using the copy above mode, and the copy above mode is redundant for the current pixel.

FIG. 16B illustrates an example of modified index prediction for the example of FIG. 16A, where the redundant index is replaced by a color index of the upper-right pixel.

FIG. 17A illustrates another example of redundant index for index prediction, where the preceding pixels are coded using the run mode, and the run mode is redundant for the current pixel.

FIG. 17B illustrates an example of modified index prediction for the example of FIG. 17A, where the redundant index is replaced by a fixed index or a derived index.

FIG. 18A illustrates an example where index $I_{above}$ is directly copied from the neighboring CU.

FIG. 18B illustrates an example where index $I_{above}$ is copied from its above pixel that in turn copies the index from the neighboring CU.

DETAILED DESCRIPTION

Figure 15A:
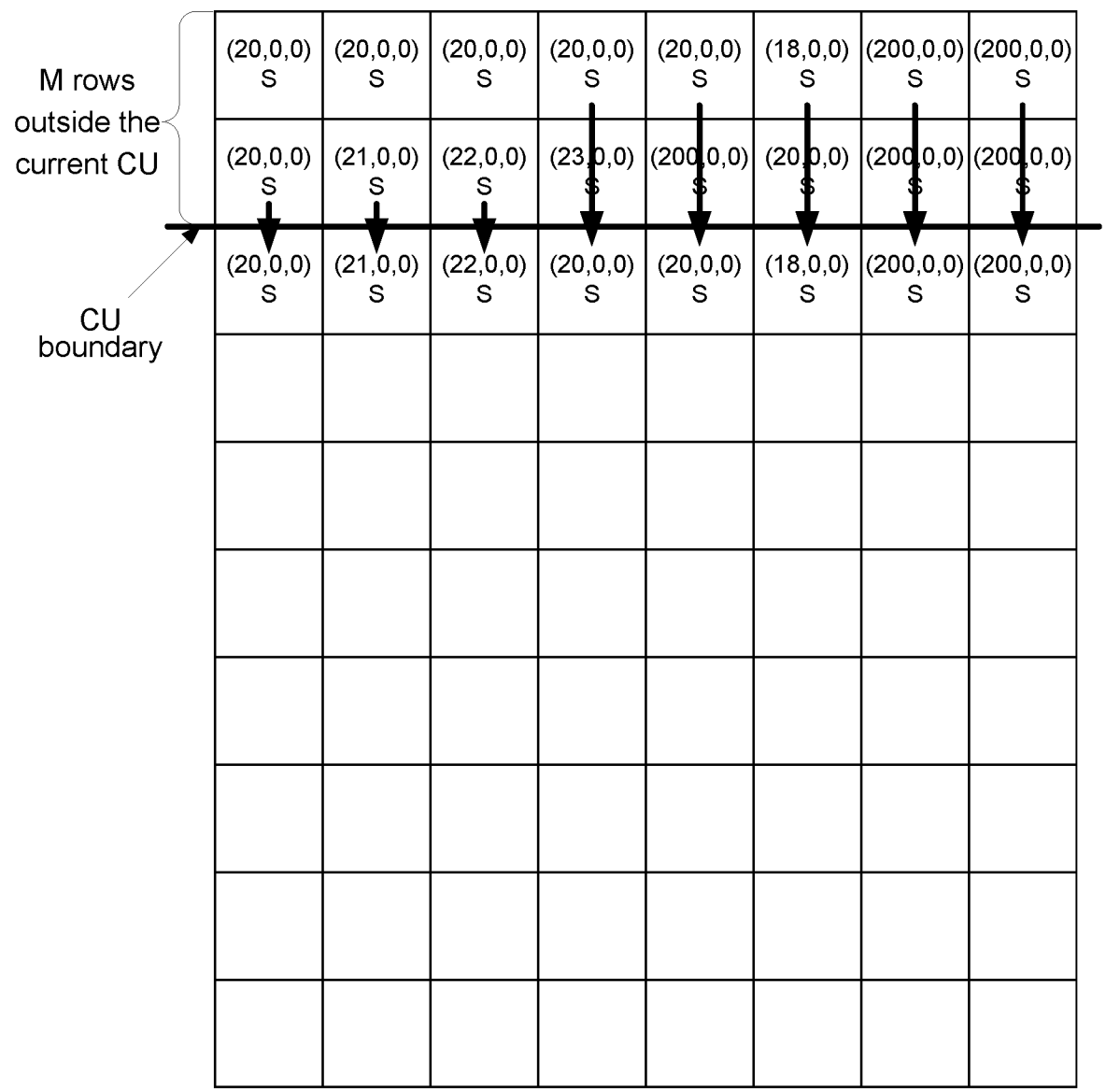
FIG. 15A illustrates an example of using a special index S for M rows of reconstructed neighboring pixels outside the current CU.

In the present invention, various techniques to improve the performance of color index coding are disclosed. In particular, major color index map of the current block is predicted using information from the reconstructed neighboring pixels (NPs) of the current block.

According to one embodiment, the encoder/decoder first determines the reconstructed neighboring pixels (NPs) for coding the color index map. Then, the reconstructed NPs are used to predict the color index of the current block (e.g., a coding unit, CU). In color index coding, the colors in a block are represented by color indices. Accordingly, the pixel values of the neighboring pixels are transformed into color indices according to a major color table (also named a color index table, palette or palette table) for the current block. The transformed color indices are then used to predict the color indices of the current block or coding unit. Table 1 illustrates a simple major color table for a current coding unit. The reconstructed pixel values of neighboring pixels can be transformed into color indexes according to the color index table. FIG. 1A and FIG. 1B illustrate an example of converting reconstructed color values of neighboring pixels to color indices according to the color index table in Table 1. In FIG. 1A, the neighboring pixels are shown as squares with filled patterns. The color values are shown as numbers in parentheses. These color values are mapped to color indices according to Table 1. The color values and corresponding color indices for the neighboring pixels are shown in FIG. 1B. The clear squares correspond to pixels of a current block (e.g., an 8×8 CU) to be Intra predicted.

TABLE 1

| Color index | Pixel value |
|---|---|
| 1 | 20 |
| 2 | 200 |

According to present invention, the neighboring pixels can be any previously decoded or reconstructed pixels, including spatial neighboring pixels or temporal neighboring pixels. The neighboring pixels can be the reconstructed pixels without any in-loop filtering such as sample adaptive offset (SAO) or deblocking filter as disclosed in the High Efficiency Video Coding (HEVC) standard. The neighboring pixels can also be the reconstructed pixels filtered by SAO, deblocking filter, or both SAO and deblocking filter. Temporal NPs can be the pixels at the collocated positions in the reference picture or the locations indicted by motion vectors. In the example of FIG. 1A and FIG. 1B, the NPs correspond to the pixels located in the nearest above row and the nearest left column.

As shown in FIG. 1A and FIG. 1B, the color values of the NPs are assigned to corresponding color indices with pixel values close to the original color values of the NPs. For example, color values from 18 to 23 are all assigned to color index 1 with a representative pixel value of 20. Similarly, color values from 201 to 205 are all assigned to color index 2 with a representative pixel value of 200. In other words, the original color values of the NPs are "quantized" to representative values associated with the color indices. In another embodiment of the present invention, a quantization table (i.e., the color index table) can be built by a decoder. For example, the quantization table can be built by quantizing pixels to the nearest major color values.

In one example, the quantization table is determined at the decoder end by defining the quantization zone: color_i-Q1 ~color_i+Q2. Pixel values from (color_i-Q1) to (color_i+Q2) are quantized into color_i, where color_i is a major color, Q1 and Q2 are integers and are transmitted or derived. For example, Q1 and Q2 can be derived according to quantization parameter (QP) associated with quantizing the transform confidents. Pixels outside quantization zone can be quantized to one or more escape indices. For example, pixels outside quantization zone can be quantized to the index with highest occurrence, the index 0, or the nearest major color value. The quantization method for pixels inside or outside quantization zone can be derived from the major color number.

Accordingly, the table used to converting the reconstructed neighboring pixel values to neighboring pixel index can be either the major color table for the current block or a quantization table derived at the decoder side. For convenience, the major color table is also considered as a quantization table in this disclosure, where the major color corresponds to a representative color in a quantization zone.

The quantization table can be built at the decoder side from the major color with the least occurrence to the major color with the highest occurrence. The overlapped region of two major colors can be overwritten from the major color with the least occurrence to the major color with the highest occurrence.

During decoding, the color index can be predicted by the NPs. FIG. 2A illustrates an example that the color index of the first pixel in the first row is predicted by the left NP. Accordingly, the index of the first pixel is decoded as 1. Based on the color index table, the color value of the first pixel can be further decoded as 20 as shown in FIG. 2B. FIG. 3A illustrates another example of color index prediction using the pixel index of a NP, where the color index of the first pixel is predicted by the left NP. However, instead of using the color value from the color index table, the reconstructed pixel value of the NP is used directly as the reconstructed color of the current pixel. Accordingly, the color value of first pixel is reconstructed as 19 instead of 20 as in the case of FIG. 2B. FIG. 3B illustrates an example where the second pixel in the first row of the block is coded using a vertical prediction mode. Again, the reconstructed color value for the second pixel is based on the reconstructed color value of the corresponding NP instead of the color value from the corresponding color index according to the color index table.

Furthermore, the pixel value of a NP may prorogate into the pixels inside the current coding unit during prediction. FIG. 4 illustrates an example where the pixel value (i.e., 22) of a NP above the second pixel of the first row of the current block prorogates into the pixels inside the current coding unit during index prediction. This case is referred as predictor propagation in this disclosure. A constraint can be applied regarding how deep (i.e., the distance between the NP to the current pixel to be predicted) that the NP can propagate. For example, a threshold can be determined and if the distance (d) between the NP and the current pixel is less than or equal to the threshold (D), the current pixel uses the reconstructed value of the NP (i.e., 22). Otherwise, the current pixel uses the color value (i.e., 20) indicated by the color index according to the color index table.

In JCTVC-O0182, escape color pixels are used in addition to various prediction modes. The index for an escape color pixel should be known in the parsing stage during decoding. To improve the parsing throughput, a constraint is applied according to an embodiment of the present invention so that the transformed color indexes of the NPs are prevented from using the escape pixel indexes. For example, if the transformed color index of a NP is the escape pixel index (e.g., 3(E) in FIG. 5A), the decoder will change the index to a predefine value (e.g., 0 in FIG. 5B).

During decoding, the color indices can be predicted by NPs along the scanning direction when the NP prediction direction is perpendicular to the scanning direction. For example, when the scanning direction is horizontal, the color indices of the first row can be predicted by the above NP (i.e., a vertical prediction direction) as shown in FIG. 6A, where the indices of all pixels in the first row and some pixels in the second row are predicted. Furthermore, using the color index table in Table 1, the reconstructed color values corresponding to FIG. 6A are shown in FIG. 6B.

A flag can be signaled to specify the use of the mode as shown in FIG. 6A and FIG. 6B. Then the number of following pixels that also use the same prediction mode can be signaled. For example, a syntax copy_above can be signaled to indicate the use of the "copy above" mode followed by the syntax run number (i.e., 10 in the example of FIGS. 6A-B as there are 11 pixels including the current pixel, and run number equals to the total number of pixel minus 1) in the bitstream to indicate the number of runs.

Figures 7B, 7C:
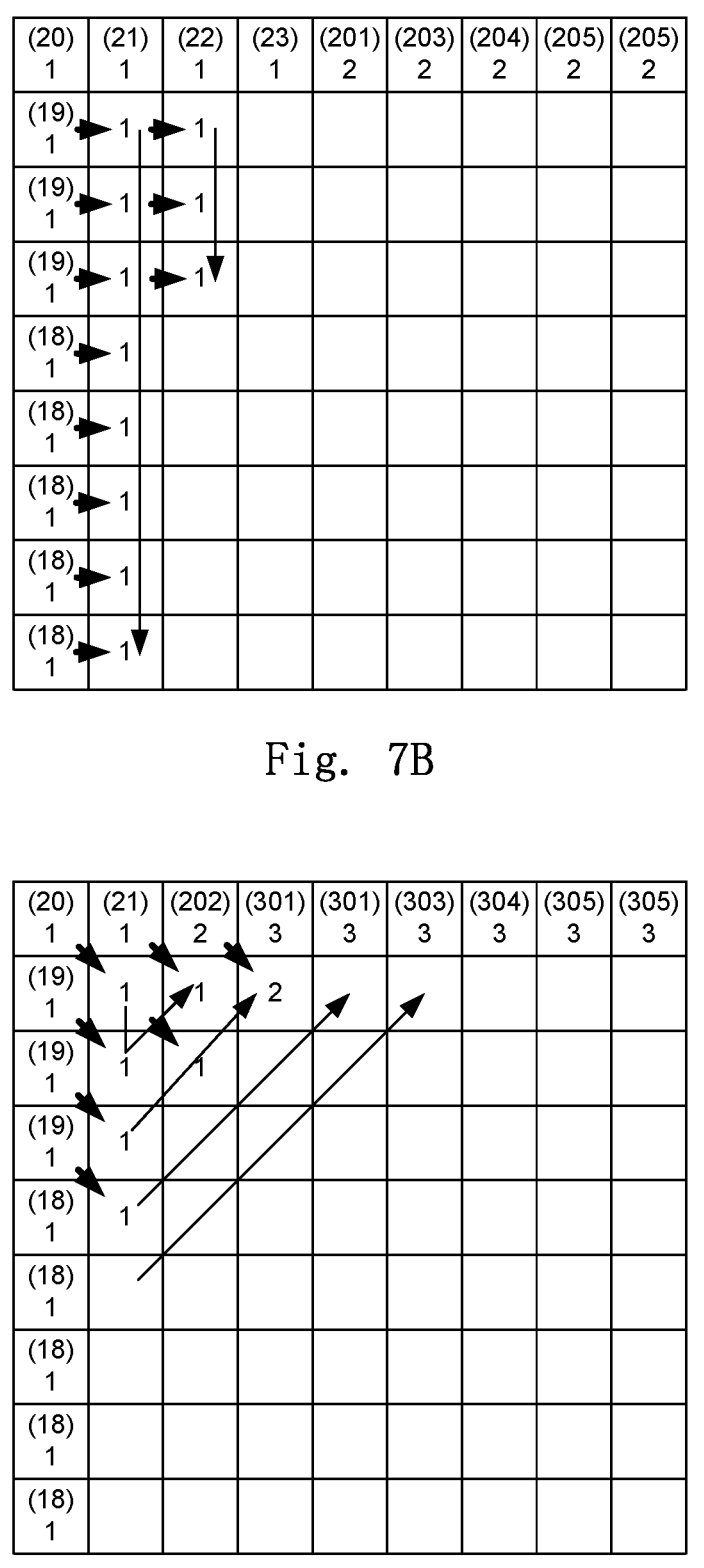

The method can be applied to a system using the scanning order different from the example in FIGS. 6A-B. For example, the scanning order is traversed as shown in FIG. 7A with the same prediction process and syntaxes as the previous example. For the example in FIG. 7A, the syntax run number 12 is signaled after syntax copy_above. FIG. 7B illustrates an example of vertical scanning order from top to bottom, where the NPs in the nearest left column are used as the index predictors. FIG. 7C illustrates an example of diagonal scanning order, where the NPs on the left-top corner pixels are used as predictors.

While the examples in FIGS. 6A-B and FIGS. 7A-C always start the scanning order from the first pixel in the block, the present invention is not limited to start from the first pixel of the block. The index prediction coding based on the NPs may also start from a non-first pixel in the current block as shown in the example of FIG. 8 using a vertical scanning order. In this case, a value to identify the copy_left mode (or copy_previous mode) is signaled after signaling the prediction on the first 3 pixels. Then run value for the copy_left prediction is 8 so syntax run_number is signaled with a value of 7 accordingly.

In another embodiment of the present invention, color indices are predicted using NPs from above regardless of the scanning order. FIG. 9A illustrates an example of horizontal scanning order. The syntax to identify the copy_above mode is signaled and followed by signaling syntax run number with a value of 8 corresponding to the run value. A syntax to identify the copy_previous mode is signaled and followed by signaling syntax run number with a value of 5. FIG. 9B illustrates an example of vertical scanning order.

FIG. 10 illustrate another example of index prediction based on neighboring pixels from above or from left regardless of scanning direction, where the scanning direction corresponds to diagonal scanning.

When the NPs are not available, the predictions will not be invoked. The value indicating the prediction mode will be inferred to the value indicating that a new index is signaled without signaling.

In the previous examples, when a pixel is predicted using other pixels (either NPs or other pixels within CU), the pixel can directly copy the color values of the predictors (e.g., RGB or YUV) instead of index values. FIG. 11 illustrates an example of copy-pixel-value version of FIG. 9A. Comparing to FIG. 9A, the prediction method in FIG. 11 is the same except that the pixel values are directly copied from corresponding predictors. The method of copying pixel values instead of copying pixel indices can be applied to other examples as disclosed herein.

Furthermore, the copy-index method and the copy-pixel-value method as disclosed above can be combined. FIG. 12 illustrates an example that the pixel value of a NP with a color value of 22 can be propagated into the pixels inside the current decoding unit during prediction. A constraint on the distance (d) between the current pixel and the NP can be used to determine whether to use the predictor value or the value represented by the predictor index according to the color index table. If the distance is smaller than a threshold (D), the decoded pixel value uses the predictor value (i.e., 22). Otherwise, the decoded pixel value uses a major color table to determine the color value (i.e., 20) for the color index 1. The combined method can be applied to all examples disclosed herein.

Prediction for Color Index Map Coding from NPs

To simplify quantization method (i.e., mapping NP values to color indices), the decoder can only tests partial colors in the color index table. If there is no matched color for a NP, the decoder can assigned a fixed or derived index to the NP.

In one example, the decoder only tests a partial set of major colors in the color index table. For example, the decoder may test the color indices from $N_{test1}$ to $N_{test2}$ in order to quantize a NP. If there is no matched color, the decoder assigns the NP with index $N_{test3}$, where $N_{test3}$ can be 0. $N_{test1}$ and $N_{test2}$ can be fixed or derived. Furthermore, $N_{test1}$ and $N_{test2}$ can be derived according to CU size. $N_{test1}$, $N_{test2}$ and $N_{test3}$ are all integers. One example is shown as follows to select a color index based on the minimum difference, where $N_{test1}$ corresponds to 0 and $N_{test2}$ corresponds to min(N,8), and N is the total number of major colors in the color index table.

$$Idx_i = \operatorname*{argmin}_{0 \leq n < min(N,8)} \left( \sum_{k=0}^{2} |NP_i[k] - Colour_n[k]| \right)$$

In the above equation, Idx is the index for the i-th neighboring pixel, $NP_i[k]$ is the color value of the k-th component of i-th neighboring pixel, and $Color_n[k]$ is the value of the kth component of n-th palette entry.

Another way to reduce the computational load is to perform the search based on reduced color component. For example, the search may use only one single color as shown below.

$$Idx_i = \operatorname*{argmin}_{0 \leq n < N}(|NP_i[0] - Colour_n[0]|)$$

To identify matched color for a NP, the decoder tests $N_{test}$ colors with a NP. If the difference between a tested color, $C_{test1}$ and the NP is less than a threshold, the NP is assigned with an index equal to $C_{test1}$. The threshold can be fixed or derived. The threshold can be derived based on quantization parameter (QP) setting for the transform coefficients associated with the coding system. If there is more than one tested colors having the corresponding differences less than the threshold for a NP, the NP can be quantized to the tested color that has smallest difference.

To simplify quantizing the NP values to color indices, if more than one tested color are within the difference less than the threshold for a NP, the NP can be quantized to the last tested color. The order to test color can be from the largest index to the smallest index, i.e., from lowest occurrence index to highest occurrence index. A higher occurrence index will overwrite a lower occurrence index if they are both within the difference threshold.

Alternatively, when more than one tested color are within the difference less than the threshold for a NP, the NP can be quantized to the earliest tested color. The order to test color can be from the smallest index to the largest index, i.e., from the highest occurrence index to the lowest occurrence index. The test process can be early terminated if there is any test color matched.

Another method to simplify quantization NP values to color indices, the decoder can only use $N_{MSB\_COLOR}$ MSBs of color values to compare a pixel with colors in palette. $N_{MSB\_COLOR}$ can be fixed or derived. $N_{MSB\_COLOR}$ can be derived according to the CU size. For different color components, $N_{MSB\_COLOR}$ can be different. For example, $N_{MSB\_COLOR}$ of Y/G component can be larger than $N_{MSB\_COLOR}$ of UV/RB component.

Redundant Index Removal for Color Index Coding Using Prediction from NPs

In Screen Content Coding Test Model 2.0 (SCM2.0), if the previous run-based mode is the copy above mode, the current index cannot be the same as the index above the current pixel when the current pixel is encoded by a new copy left run. Otherwise, the current index coding can be merged into the previous run. This type of redundant index value is referred as Irun_red in this disclosure. On the other hand, in SCM2.0, there is no copy above run in the first row. Therefore, the decoder does not need to perform redundant index checking for copy above run (i.e., the copy above mode) in the first row.

In one embodiment of the present invention, the redundant index is removed for the first row. In particular, the redundant index removal is based on the NP. When encoding the first row pixels, the encoder can check if the previous run is copy above run. If so, the current index cannot be the same as the index of the above NP when the current pixel is encoded by a new copy left run. In this case, the redundant index, Irun_red is equal to the index of the above NP of the current index.

To improve parsing throughput, the decoder needs only to parse the encoded index values by removing Irun_red in the parsing stage. The decoder then reconstructs the full palette indices by adding Irun_red in the reconstruction stage. Therefore, the quantization process to convert NP values to color indices can be moved to the reconstruction stage for improving parsing throughput.

Prediction for Color Index Map Coding

The color index map of the current block can be predicted from the neighboring pixels (NPs) of the current block. When coding the color index map, the encoder/decoder can first determine the neighboring pixels. Then, the NPs can be used to predict the color index of the current block. Before applying the color index map prediction, the NP values can be mapped to color indices according to the color index table of the current block or using a quantization table. The color indices can then be used to predict the color index of the current block. FIGS. 16A and 16B illustrate an example of the color index prediction. In this example, indices in the first line and some pixels in the second line of the block are copied from the neighboring pixels of the above line as shown in FIG. 16A. The reconstructed color values can be obtained from the color indices using a color index map.

Mapping Color Ondex to Neighboring Pixels

In order to assign color indices to neighboring pixels, the color index table of the current block can be used. By using the color index table of the current block, the relationship between color index table and neighboring pixel are evaluated and a mapping is selected according to a criterion, such as a minimum difference. The process may be computational intensive and may also involve heavy memory access. Therefore, it is desirable to develop means to reduce the required computations and/or reduce the required memory access.

Preventing Escape Mode in Neighboring Pixels

In order to improve the throughput of parsing and decoding the coded index, the index escape mode is not used for the neighboring pixels. Accordingly, the corresponding pixel value that is not mapped to any index in the color index table can be avoided. With the escape mode skipped, two index mapping schemes are disclosed as follows.

a. Mapping Index with Minimum Difference

The index that has a minimum difference between the corresponding color of the index and the neighboring pixel value can be mapped to the each neighboring pixel. If the palette table as shown in Table 2 is used and the value of a neighboring pixel is 15, the index that results in the minimum difference is index 1. Therefore, index 1 is mapped to the color value 15. If the color value of the neighboring pixel is 50, the index that results in the minimum difference is index 1. Therefore, index 1 is mapped to color value 50.

TABLE 2

| Color index | Pixel value |
|---|---|
| 0 | 8 |
| 1 | 20 |

The difference can be defined as follows.

$$\text{Diff}=\text{abs}(NP_{luma}-P_{i,luma}) \quad (1)$$

where abs( ) indicates absolute value, $NP_{luma}$ corresponds to the luma value of a neighboring pixel and $P_{i,luma}$ corresponds to the luma value of i-th index in the palette.

In another example, the difference can be defined as follows.

$$\text{Diff}=\Sigma_{comp\_number} w_{comp} \times \text{abs}(NP_{comp}-P_{i,comp}) \quad (2)$$

where comp_number indicates the number of components available in the picture and comp indicates one of the components, and $W_{comp}$ indicates the weight for each component. Accordingly, the difference defined in equation (2) corresponds to a weighted sum of absolute differences of individual components.

In yet another example, the difference is defined as follows.

$$\text{Diff}=\Sigma_{comp\_number} w_{comp} \times (NP_{comp}-P_{i,comp})^2 \quad (3)$$

where comp_number indicates number of components available in the picture and comp indicate one of the components, and $w_{comp}$ indicates weight for each component.

b. Mapping Index with Minimum Difference and Threshold

Besides identifying the palette color with the minimum difference as shown in the examples above, an additional threshold constraint can be imposed. For example, after identifying the palette color that has the smallest difference with the neighboring sample, the difference can be further compared to a threshold. Only if the difference is smaller than the threshold, the neighboring sample will be mapped to the palette index. If the minimum difference is greater than or equal to a threshold, the sample is mapped to a predefined index. While a specific example of color index table of Table 2 is used to illustrate the process of deriving the index for the neighboring pixel, the present invention is not limited to specific table size (i.e., number of entries in the table) and the color values.

Allowing Escape in Neighbor Pixels

In another embodiment of the present invention, the escape index (mode) is allowed for the neighboring pixels. With the escape mode allowed, two index mapping schemes are disclosed as follows.

a. Indexing Escape by Minimum Difference and a Threshold

Similar to the scheme of mapping index with minimum difference and threshold for the case with the escape mode skipped, the scheme of mapping index with minimum difference and threshold scheme can be applied to the case with the escape mode allowed. After identifying the palette color that has the smallest difference with the neighboring sample, the difference is further compared to a threshold. Only if the difference is smaller than the threshold, the neighboring sample is mapped to the color index. If the minimum difference is greater than or equal to a threshold, the sample is mapped to the escape index or coded using the escape mode. In this case, the corresponding pixel value is not mapped to any index in the color index table. The escape index in the neighbor pixel can be handled the same way as an escape index in the current block.

b. Indexing Escape by a Threshold

If the index with a higher priority (i.e., a smaller index value) has a difference between its corresponding color value and a neighboring pixel value smaller than a threshold, the index can be mapped to the neighboring pixel value. If the color index table as shown in Table 2 is used, the value in neighboring block is 15 and the threshold is 8, the first index with a corresponding color value has a difference (i.e., 7) smaller than the threshold (i.e., 8) can be assigned to index 0. Then index 0 is mapped to pixel value 15. If the value of the neighboring pixel is 50, no pixel value in the color index table has a difference smaller than the threshold. In this case the value is mapped to the escape index, which means that the corresponding pixel value is not mapped to any index in the color index table. The escape index for the neighboring pixel can be handled the same way as the escape index in the current block.

Entropy Coding for Color Index Coding

In SCM2.0, a color index represented by a truncated unary binary code is signaled when prediction is not applied. In addition, the coded value is determined by taking into consideration of the difference between the current index and the index of its neighboring pixels. In the parsing stage, the index of the neighboring pixel can be undetermined. In this case, those values are assumed to be a predefined value such as (maxium_palette_size+1). The predefined value cannot be used by other indices. When the predefined value is set to (maximum_palette_size+1), the current index is always binarized the same way as if there were no predefined value. The predefined value may also correspond to other possible values.

Figures 13A, 13B:
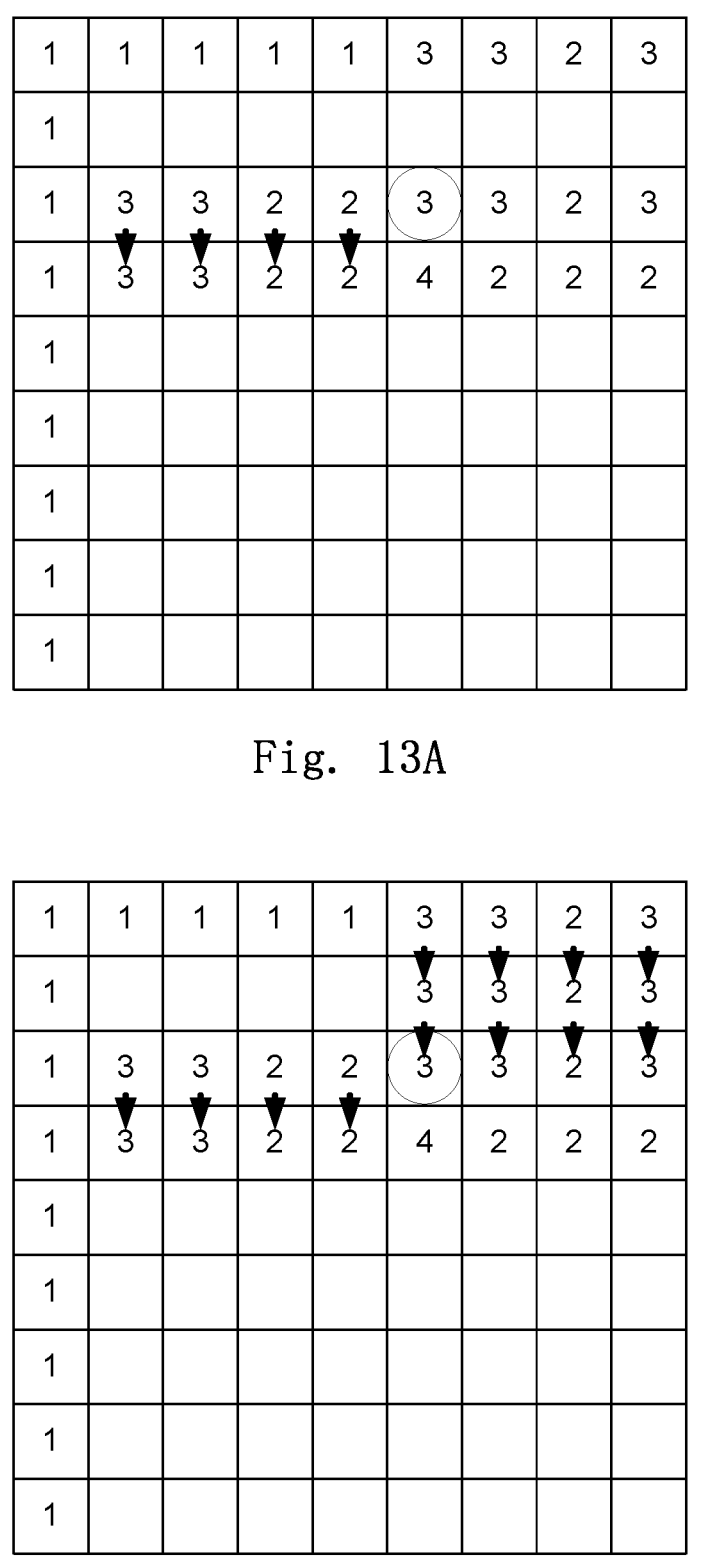

FIG. 13A illustrates an example of possible situations. The pixel indicated by a patterned square is the current pixel. The proceeding 4 pixels are predicted from the above line. The current index (i.e., 4) references to the index of above pixel (i.e., 3). Since the above index (i.e., 3) is smaller than the current index (i.e., 4), the reduced current index value (i.e., 4−1=3) is binarized with truncated binarization and the color index table size is reduced by 1.

FIG. 13B illustrates another example of index coding according to an embodiment of the present invention. Again, the pixel indicated by a patterned square is the current pixel. The proceeding 8 pixels are predicted by an above line. The current index (i.e., 4) references to the index of above pixel (i.e., 3) indicated by a circle. Since the index of above pixel inherits the index value of the neighboring values around the current block, the index of above pixel (i.e., 3) can be undetermined in parsing stage especially in the case that above block is not reconstructed before the parsing of the current block. Therefore a predefined value, such as 5, can be used to determine the value to be binarized. Since the predefined value (i.e., 5) is larger than the current index (4), value (4) is binarized with truncated binarization and the color index table size for coding is not changed.

Figure 14:
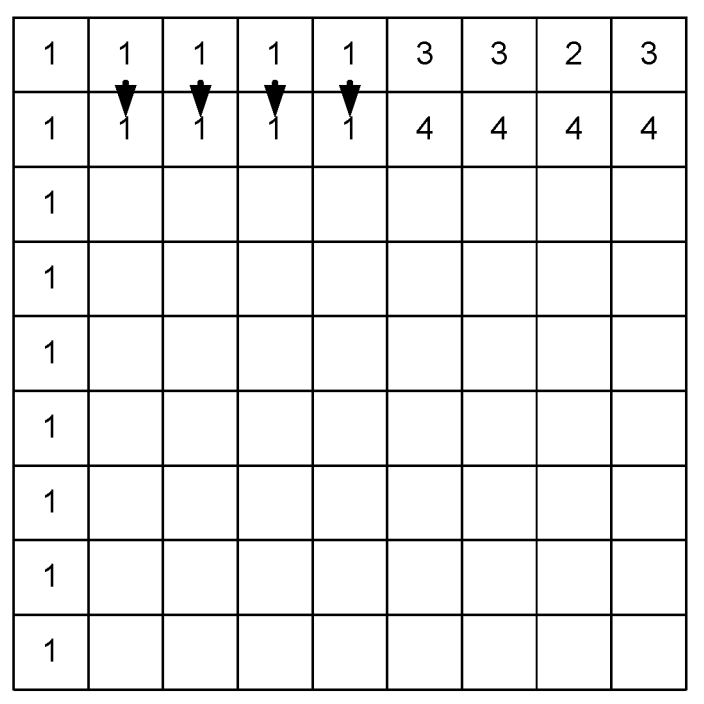

FIG. 14 illustrates another example of color index coding. The pixel indicated by a patterned square is the current pixel. When the current pixel is located in the first line of the current block and the proceeding pixels are predicted as copy from above, the current pixel requires the index of above pixel to be code/decoded, where the pixel value may be unknown in the parsing stage.

In this case, a predefined value (e.g., 5) can be used and the value will be binarized. Since the predefined value (i.e., 5) is larger than the current index (i.e., 4), the current index value (i.e., 4) is binarized with truncated binarization and the color index table size for coding is not changed. If the predefined value is set to 0, the index value is smaller than the current index (i.e., 4), a reduced index value (i.e., 3) is binarized with truncated binarization and the palette size for coding is reduced by 1.

The use of a predefined value for an undetermined color index as disclosed above can also be applied to other color index coding situations that utilize an undetermined color index in the parsing stage.

Direct Copy of Reconstructed Value in Copy Mode

In copy mode, a value "copy_run" (e.g., N) is transmitted or derived to indicate that for the following N positions (including the current one), the pixels values are equal to the reconstructed pixel values in the respective copy mode position (e.g., above, left, top-left, above M line, top-right, etc.). No escape code (e.g. coding the escape value) is required in these copy reconstructed mode In an alternative embodiment, in copy mode, a value "copy_run" (e.g., N) is transmitted or derived to indicate that for the following N positions including the current pixel, the pixels values are equal to the reconstructed pixel values in the respective copy mode position (e.g., above, left, top-left, above M line, top-right, etc.). If the predictor pixel is escape coded, the selected current is inferred as escape coded and the escape pixel value are encoded.

Special Index S for Above Neighboring Pixels Cross CU Boundary

If the above neighboring pixels are across the CU boundary, a special index (e.g., "S") for the neighboring CU pixel (NCPs) can be assigned according to an embodiment of the present invention as shown in FIG. 15A. The pixels shown in filled pattern correspond to M rows of neighboring pixels outside the CU boundary. When a pixel is signaled by a COPY-RUN, it will copy not only the above pixel's pixel index (S) but also the above pixel's pixel value, as shown in FIG. 15A. For example, the first three pixels in the first row of the CU use copy above mode. The remaining pixels in the first row are copied from the second row above the CU boundary. Since all the referred neighboring pixels are outside the CU boundary, a special index S is used for the neighboring pixels. The special value S, can be a value different from all possible index values. For example, the special value S may be equal to (maximal index value+1).

Direct Copy of Reconstructed Value in Copy Mode for Escape Samples

Another aspect of the present invention addresses the issue of direct copy mode for the escape sample. In the copy mode, a value "copy_run" (e.g., N) is transmitted or derived to indicate that for the following N positions (including the current one), the color indices are equal to the color indices in the respective copy mode positions (e.g., above, left, top-left, above M line, top-right, etc.). However, if the predictor is an escape sample, the current sample not only copies the index (the escape index) but also copies the reconstruction value (e.g., the escape value) from the predictor. No escape code is required in these copy reconstructed modes.

In the copy previous mode, a value Arow and a value "copy previous run" (e.g., N) is transmitted or derived to indicate that for the following N positions (including the current one), the color indices are equal to color indices in the previous row with distance Arow. However, if the predictor is an escape sample, the current sample not only copies the index but also copies the reconstruction value from the predictor. No escape code is required in these copy reconstructed modes. For example, if the predictor in inside the current CU, the current sample copies the escape value from the predictor. If the predictor is outside the current CU, the current sample copies the reconstruction value from the predictor.

Unification of "Escape Color with Prediction Mode" and "Prediction for Color Index Map Coding from NPs"

The method "Escape color with prediction mode" and the method "Prediction for color index map coding from NPs" can be unified. In the method "Prediction for color index map coding from NPs", the decoder can directly infer indices of the NPs as the escape index. As the result, if pixels in the first row are signaled as copy above mode, the pixel will be predicted from the escape index. To deal with prediction from an escape index, the reconstructed value in the copy mode is directly copied if the predictor is escape sample. The index of the NP is directly inferred as an escape index. In other words, if the pixel is predicted by the NPs (copy above mode or copy previous mode), the decoder will copy pixel values of the NPs. The reconstructed index of the pixels predicted is inferred as the escape index. The NPs can be multiple rows outside the current CU. The NPs can be M rows outside the current CU. M can depend on the color format or buffer size of deblocking filter. For example, M for the luma component can be 4 and M for the chroma component can be 2.

Figure 15B:
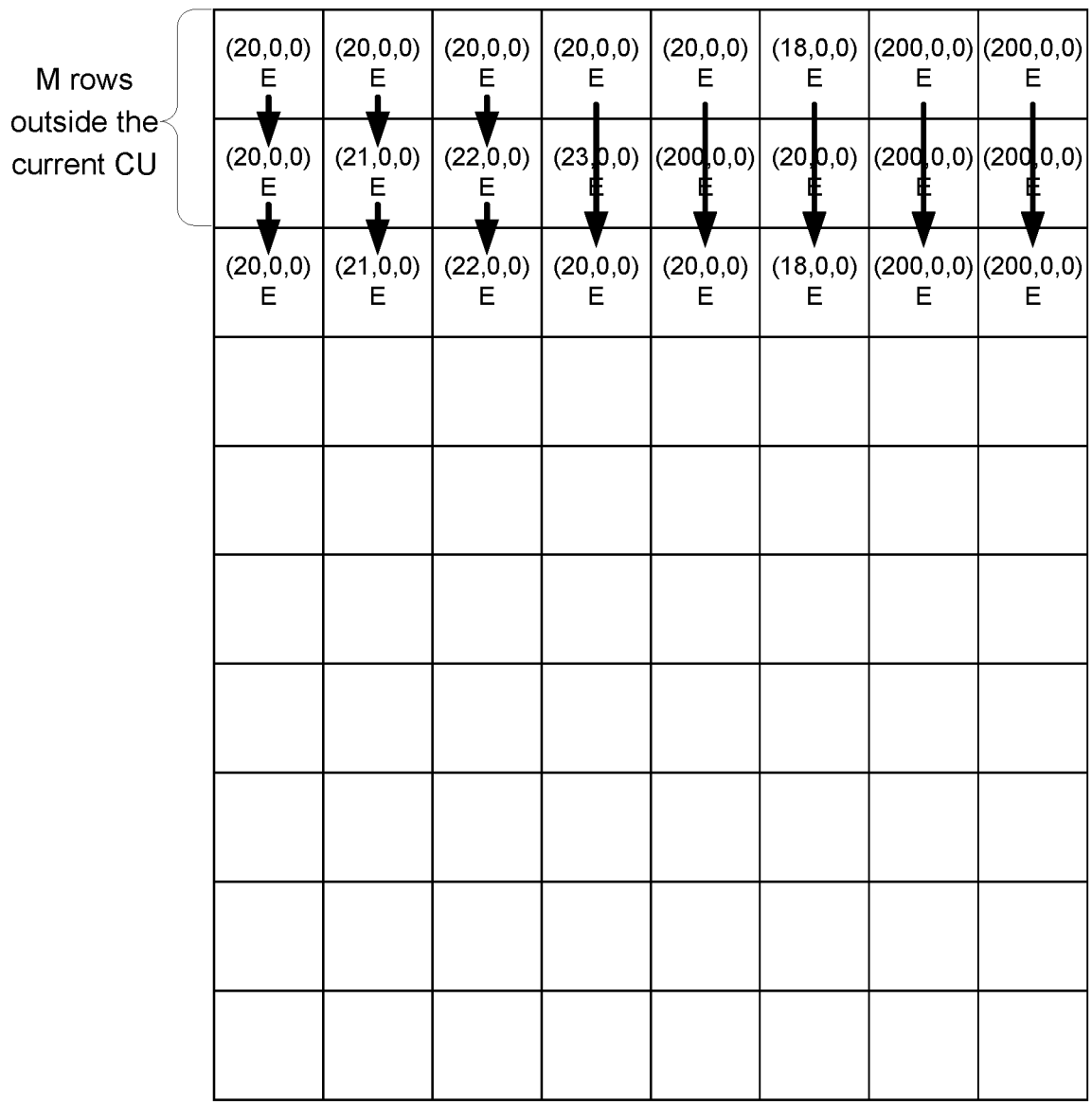
FIG. 15B illustrates an example of index prediction using M rows reconstructed neighboring pixels outside the current CU, where the reconstructed neighboring pixels use the escape index.

FIG. 15B illustrates an example of the unified approach. The NPs can be M rows outside the current CU. In FIG. 15B, M is 2. The index inside the CU can be predicted from the NPs using the copy above mode or copy previous mode. The indices of the NPs are directly inferred as an escape index. If the pixel is predicted from NPs (copy above mode or copy previous mode), the decoder will copy pixel values of NPs. The reconstructed indices of the pixels are also copied from the indices of the NPs (inferred as the escape index).

Refinement of Copy Above Run Mode

In the color index coding, the redundant index Irun_red of the current pixel can be derived from the last coded prediction mode. For the prediction mode other than the last coded prediction mode, if the first index predictor is the same as the Irun_red, the first index predictor can be replaced by a replacement index corresponding to a fixed index or derived index. The replacement index can be 0 or the smallest non-redundant index that is not equal to Irun_red. For example, if Irun_red is 0, the replacement index can be set to 1. Otherwise, the replacement index can be set to 0. The index replacement method can be disabled if the Irun_red is equal to the escape index.

As mentioned before, in SCM2.0, if the previous prediction mode is the copy above mode, the current index cannot be the same as the above index. Otherwise, the current index coding can be merged into the previous run of copy above mode. The redundant index value is referred as Irun_red. For example, index A in FIG. 16A is a redundant index. The current index as indicated by a question mark cannot be index A. According to an embodiment of the present invention, refined prediction source is disclosed for other prediction mode. For example, if the prediction mode is copy-above-right, the index of the above-right pixel cannot be A. It can be replaced by a replacement index corresponding to a fixed index or derived index such as index C in FIG. 16B, where C can be 0 or the smallest non-redundant index that is not equal to Irun_red. For example, if Irun_red is 0, index C can be set to 1. Otherwise, index C can be set to 0.

In another example, if the previous prediction mode is run-based mode (e.g., copy left run), the current index cannot be the same as the left index. Otherwise, the current index coding can be merged into the previous run of run_mode. FIG. 17A illustrates an example of such situation, where the coding for the current pixel (indicated by a question mark) cannot be index A (i.e., the redundant index). However, if the above index of current to-be-encode index is equal to Irun_red, the copy above prediction of current index is redundant. Therefore, in this case, an embodiment according to the present invention replaces the index predictor of the above index if the copy above mode is used.

If the above index of current to-be-encode index is equal to Irun_red (e.g., index A) as shown in FIG. 17A, the decoder can replace the index predictor of the above index in the copy above mode by a replacement index that is fixed index or derived index, such as index C in FIG. 17B. C can be 0 or the smallest non-redundant index that is not equal to Irun_red. For example, if Irun_red is 0, the C can be set to 1. Otherwise, C can be set to 0.

The redundant index determination and processing as mentioned above can be applied to different prediction modes. For example, the Irun_red can be the redundant index of any prediction modes, such as the index of the above-2-row mode for copy-above-2-row-more. If the last coded mode is run_mode and the previous coded index is the same as Irun_red, the Irun_red of the prediction mode (e.g., the index of the above 2 row for copy-above-2-row-more) can be replaced with the derived index.

An encoder mode selection method can be applied. If the copy above mode can be selected, the prediction mode is set to copy above mode even if the run of run_mode is much larger than the run of copy above mode.

If the predictor is replaced by the replacement index, the index coding of run_mode can be modified. Two redundant indices, the Irun_red and the replacement index, can be removed. For example, if the last coded mode is run_mode, the above index is the same as the previous index and the above index is not the escape index, then two indices can be removed in the index coding of run_mode for the current pixel. One of the two indices removed is the previous index and the other is the replacement index.

In another example, if the last coded mode is run_mode, the above index is the same as the previous index, the maximum possible index is larger than 2 and the above index is not the escape index, then two indices can be removed in the index coding of run_mode for the current pixel. One of the two indices removed is the previous index and the other is the replacement index.

In another example, if the last coded mode is run_mode, the above index is the same as the previous index and the max possible index is larger than 2, then two indices can be removed in the index coding of run_mode for current pixel. One of the two indices removed is the previous index and the other is the replacement index.

In SCM2.0, if the previous run is the copy above run, the current pixel (Pc) cannot have the same index as the index of the above pixel (Pa) when it is the first pixel of a new index run. Otherwise, the current pixel would be merged into the previous run. In this case, the index (Ic) of the current pixel can be coded with redundancy removal. The index of the above pixel is referred as $I_{above}$ and index of the previous pixel ($P_{left}$) is referred as $I_{left}$. The previous pixel can be the left or right pixel based on the traverse scan direction and the above pixel can be 1 row above the current pixel or 1 column to the left of the current pixel based on the scanning direction. In one embodiment, if $P_{left}$ is the copy above mode and $I_{above}$ is from the above CU in the horizontal scan or the left CU in the vertical scan, the redundant index removal can be disabled. FIG. 18A illustrates the case that $I_{above}$ is directly copied from the neighboring CU. FIG. 18B illustrates that $I_{above}$ is copied from its above pixel that in turn copies the index from the neighboring CU. In one embodiment, when the $P_{left}$ is the copy above mode and the current pixel is on the first N rows of current CU, the redundancy removal will be disabled. In another embodiment, when $P_{left}$ is thecopy above mode, the index redundancy removal will be disabled. Furthermore, if Irun_red is from NP, the redundant index removal method can be disabled.

The performance of a coding system incorporating an embodiment of the present invention is compared to that for an anchor system. The anchor system corresponds to the system based on SCM-2.0, where no prediction cross coding units is allowed. The embodiment of the present invention allows index prediction using neighboring pixels corresponding to one row above the current coding unit and one column to the left of the current coding unit. The comparisons are performed under various coding configurations including All Intra (AI), Random Access (RA) and Low-delay B frame (LB). The comparison results are summarized in Table 3A-Table 3C corresponding to AI, RA and LB configurations respectively. The embodiment of the present invention results in lower BD-rates (i.e., negative values) compared to the anchor system. The BD-rate is a well-known performance measure in the field of video coding. As shown in Table 3A-Table 3C, the performance improvement in terms of BD-rate is as high as 2.5%, 1.5% and 1.3% for AI, RA and LB configurations respectively.

TABLE 3A

| | All Intra | | |
|---|---|---|---|
| | G/Y | B/U | R/V |
| RGB, text & graphics with motion, 1080 p | −2.1% | −2.1% | −2.1% |
| RGB, text & graphics with motion, 720 p | −0.7% | −0.7% | −0.7% |
| RGB, mixed content, 1440 p | −0.3% | −0.5% | −0.5% |
| RGB, mixed content, 1080 p | −0.3% | −0.4% | −0.4% |
| RGB, Animation, 720 p | 0.0% | −0.1% | −0.1% |
| RGB, camera captured, 1080 p | 0.0% | 0.0% | 0.0% |
| YUV, text & graphics with motion, 1080 p | −2.5% | −2.5% | −2.5% |
| YUV, text & graphics with motion, 720 p | −0.8% | −0.9% | −1.1% |
| YUV, mixed content, 1440 p | −0.5% | −0.8% | −0.9% |
| YUV, mixed content, 1080 p | −0.5% | −0.6% | −0.6% |
| YUV, Animation, 720 p | 0.0% | −0.2% | −0.1% |
| YUV, camera captured, 1080 p | 0.0% | 0.0% | 0.0% |
| Enc Time[%] | | 101% | |
| Dec Time[%] | | 124% | |

TABLE 3B

| | Random Access | | |
|---|---|---|---|
| | G/Y | B/U | R/V |
| RGB, text & graphics with motion, 1080 p | −1.1% | −1.2% | −1.2% |
| RGB, text & graphics with motion, 720 p | −0.5% | −0.6% | −0.6% |
| RGB, mixed content, 1440 p | −0.2% | −0.4% | −0.4% |
| RGB, mixed content, 1080 p | −0.2% | −0.2% | −0.4% |
| RGB, Animation, 720 p | −0.1% | 0.0% | −0.1% |
| RGB, camera captured, 1080 p | 0.0% | −0.1% | 0.0% |
| YUV, text & graphics with motion, 1080 p | −1.3% | −1.5% | −1.5% |
| YUV, text & graphics with motion, 720 p | −0.6% | −0.7% | −0.8% |
| YUV, mixed content, 1440 p | −0.3% | −0.6% | −0.5% |
| YUV, mixed content, 1080 p | −0.3% | −0.5% | −0.5% |
| YUV, Animation, 720 p | −0.1% | −0.2% | −0.2% |
| YUV, camera captured, 1080 p | 0.0% | 0.0% | −0.1% |

TABLE 3B-continued

| | Random Access | | |
|---|---|---|---|
| | G/Y | B/U | R/V |
| Enc Time[%] | | 100% | |
| Dec Time[%] | | 121% | |

TABLE 3C

| | Low delay B | | |
|---|---|---|---|
| | G/Y | B/U | R/V |
| RGB, text & graphics with motion, 1080 p | −1.0% | −1.0% | −1.0% |
| RGB, text & graphics with motion, 720 p | −0.7% | −0.7% | −0.5% |
| RGB, mixed content, 1440 p | −0.3% | −0.5% | −0.3% |
| RGB, mixed content, 1080 p | −0.6% | −0.1% | 0.3% |
| RGB, Animation, 720 p | 0.0% | 0.0% | 0.0% |
| RGB, camera captured, 1080 p | 0.0% | 0.0% | 0.0% |
| YUV, text & graphics with motion, 1080 p | −1.0% | −1.3% | −1.2% |
| YUV, text & graphics with motion, 720 p | −0.5% | −0.5% | −0.9% |
| YUV, mixed content, 1440 p | −0.1% | −0.7% | −0.6% |
| YUV, mixed content, 1080 p | −0.4% | −0.3% | −0.5% |
| YUV, Animation, 720 p | 0.0% | −0.3% | 0.1% |
| YUV, camera captured, 1080 p | 0.0% | −0.1% | 0.0% |
| Enc Time[%] | | 99% | |
| Dec Time[%] | | 124% | |

The performance of a coding system incorporating another embodiment of the present invention is compared to that for an anchor system. The anchor system corresponds to the system based on SCM-2.0, where no prediction cross coding units is allowed. The embodiment of the present invention is similar to the previous embodiment. However, simplified processing including mapping NP values with no match to a default index (method 1), selecting index for the NPs by evaluating a partial set of major colors (method 2) or using a single color component (method 3), and reconstructing pixel values by copying the reconstructed neighboring pixel values (method 4). The comparison results are summarized in Table 4 for the AI configurations. As shown in Table 4, the performance improvement in terms of BD-rate is as high as 0.2%, 2.3%, 2.4% and 1.9% for simplification method 1, 2, 3 and 4 respectively.

TABLE 4

| | Proposed Method All Intra G/Y | Simplified Method1 All Intra G/Y | Simplified Method2 All Intra G/Y | Simplified Method3 All Intra G/Y | Simplified Method4 All Intra G/Y |
|---|---|---|---|---|---|
| RGB, text & graphics with motion, 1080 p | −2.1% | −0.2% | −1.9% | −1.8% | −1.6% |
| RGB, text & graphics with motion, 720 p | −0.7% | −0.2% | −0.5% | −0.5% | −0.4% |
| RGB, mixed content, 1440 p | −0.3% | 0.0% | −0.3% | −0.3% | −0.1% |
| RGB, mixed content, 1080 p | −0.3% | 0.0% | −0.3% | −0.3% | −0.1% |
| RGB, Animation, 720 p | 0.0% | 0.0% | 0.0% | 0.0% | 0.0% |
| RGB, camera captured, 1080 p | 0.0% | 0.0% | 0.0% | 0.0% | 0.0% |
| YUV, text & graphics with motion, 1080 p | −2.5% | −0.3% | −2.3% | −2.4% | −1.9% |
| YUV, text & graphics with motion, 720 p | −0.8% | 0.0% | −0.7% | −0.7% | −0.5% |
| YUV, mixed content, 1440 p | −0.5% | 0.0% | −0.4% | −0.4% | −0.2% |
| YUV, mixed content, 1080 p | −0.5% | 0.0% | −0.4% | −0.5% | −0.2% |
| YUV, Animation, 720 p | 0.0% | 0.0% | 0.0% | 0.0% | 0.0% |
| YUV, camera captured, 1080 p | 0.0% | 0.0% | 0.0% | 0.0% | 0.0% |
| Enc Time[%] | 101% | 101% | 101% | 101% | 101% |
| Dec Time[%] | 124% | 104% | 103% | 104% | 109% |

Figure 19:
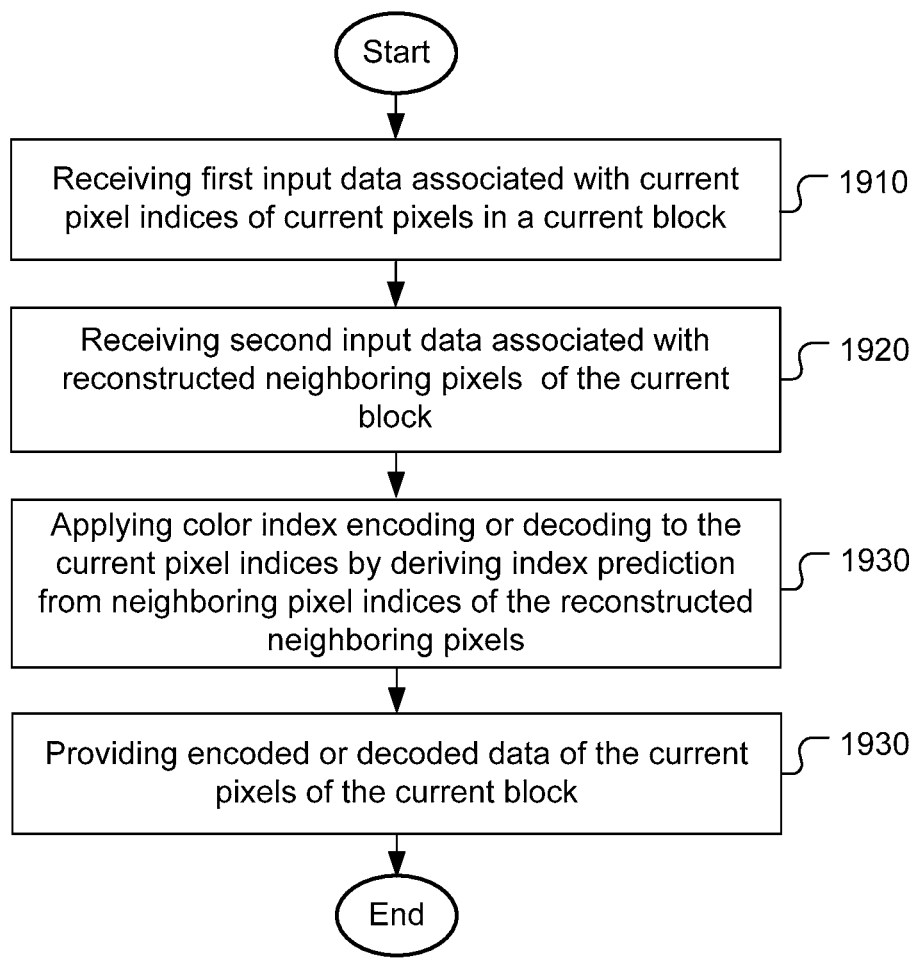
FIG. 19 illustrates an exemplary flowchart of a system for color index prediction using neighboring pixels according to an embodiment of the present invention.

FIG. 19 illustrates an exemplary flowchart of a system for color index prediction using neighboring pixels according to an embodiment of the present invention. The system receives first input data associated with current pixel indices of current pixels in a current block as shown in step 1910. The first input data corresponds to pixel data or color indices of the current block to be coded at an encoder side or corresponds to coded data or coded color indices of the current block to be decoded at the decoder side. The input data may be retrieved from memory (e.g., computer memory, buffer (RAM or DRAM) or other media) or from a processor. Second input data associated with the reconstructed neighboring pixels of the current block is received in step 1920. Color index encoding or decoding is applied to the current pixel indices by deriving index prediction from neighboring pixel indices of the reconstructed neighboring pixels in step 1930. The encoded or decoded data of the current pixels of the current block is then provided in step 1940.

The flowcharts shown are intended to illustrate an example of color index coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a block of video data using color index coding in a video coding system, the method comprising:

receiving first input data associated with current pixel indices of current pixels in a current block;

receiving second input data associated with reconstructed neighboring pixels inside a neighboring block of the current block;

using predictor propagation to derive prediction of the current pixel indices based on neighboring pixel indices of the reconstructed neighboring pixels inside the neighboring block;

assigning a special index to the reconstructed neighboring pixels of the current block, and a coded first current pixel having the special index is reconstructed by directly copying from a pixel value of a corresponding reconstructed neighboring pixel of the current block or reconstructed neighboring pixel outside of the current block;

encoding or decoding the current pixel indices based on the derived prediction; and providing encoded or decoded data of the current pixels of the current block.

2. The method of claim 1, wherein for the current pixels in a first row of the current block, if a previous prediction mode of a given current pixel is a copy-above-run mode, the copy-above-run mode is redundant and is excluded from candidate prediction modes for the current pixel, wherein the copy-above-run mode encode or decode one or more selected pixels by copying one or more corresponding pixels above said one or more selected pixels.

3. The method of claim 1, further comprising transforming reconstructed neighboring pixel values into the neighboring pixel indices according to a quantization table to map between major color indices and major color values.

4. The method of claim 3, wherein the quantization table is based on a major color table for the current block.

5. The method of claim 3, wherein the quantization table is derived at a decoder side.

6. The method of claim 3, wherein every neighboring pixel value of the reconstructed neighboring pixels is transformed into one major color index in the quantization table.

7. The method of claim 3, wherein the current pixels are reconstructed by converting decoded current pixel indices to reconstructed current pixel values according to the quantization table.

8. The method of claim 3, wherein the current pixels are reconstructed by directly copying the reconstructed neighboring pixel values.

9. The method of claim 3, wherein index 0 is assigned to a given reconstructed neighboring pixel value if no match can be found between the given reconstructed neighboring pixel value and any major color value in the quantization table.

10. The method of claim 3, wherein a given reconstructed neighboring pixel value is evaluated against a partial set of the major color indices in the quantization table to identify a matched major color index as a selected neighboring pixel index.

11. The method of claim 3, wherein a given reconstructed neighboring pixel value is evaluated against a partial set of color components associated with the major color indices to identify a matched major color index as a selected neighboring pixel index.

12. The method of claim 3, wherein a given reconstructed neighboring pixel value is evaluated against all major color indices in the quantization table, and a matched major color index is identified as a selected neighboring pixel index if the given reconstructed neighboring pixel value has a minimum difference with the major color value corresponding to the matched major color index among all major color values.

13. The method of claim 3, wherein a given reconstructed neighboring pixel value is evaluated against the major color indices in the quantization table, and a matched major color index is identified as a selected neighboring pixel index if a difference between the given reconstructed neighboring pixel value and the major color value corresponding to the matched major color index is smaller than a threshold.

14. The method of claim 13, wherein if more than one matched major color index is identified, the matched major color index identified the earliest is used as the selected neighboring pixel index.

15. The method of claim 1, wherein if an above pixel above the current pixel is predicted by a first reconstructed neighboring pixel, the current pixel index is coded by referring to the above pixel without redundant index removal, if a first index associated with a previous pixel of the current pixel is a copy-above-run mode and a second index associated with the above pixel of the current pixel is from an above coding unit (CU) in a horizontal scan or a left CU in a vertical scan, the redundant index removal is disabled.

16. The method of claim 1, wherein the reconstructed neighboring pixels correspond to previously coded or reconstructed spatial neighboring pixels, previously coded or reconstructed temporal neighboring pixels, or both.

17. The method of claim 1, wherein a first current pixel in each current row of the current block is predicted based on a left reconstructed neighboring pixel.

18. The method of claim 1, wherein if a selected current pixel is not adjacent to any above reconstructed neighboring pixel or any left reconstructed neighboring pixel, the selected current pixel is predicted by the above reconstructed neighboring pixel in a same column or the left reconstructed neighboring pixel in a same row.

19. The method of claim 1, wherein if a selected current pixel has no reconstructed neighboring pixel available for the index prediction, an index prediction mode is used to indicate an index mode being used to signal a new index for the selected current pixel.

20. The method of claim 1, wherein the reconstructed neighboring pixels include one or more rows of the reconstructed neighboring pixels above the current block.

21. The method of claim 1, wherein if a prediction copy mode is used for a selected current pixel and a corresponding predictor has an escape mode, the selected current pixel is decoded to have an escape index associated with the corresponding predictor.

22. The method of claim 21, wherein if the corresponding predictor is within the reconstructed neighboring pixels, the selected current pixel is decoded by copying the reconstructed neighboring pixel value of the corresponding predictor.

23. An apparatus for coding a block of video data using color index coding in a video coding system, the apparatus comprising one or more electronic circuits configured to:
  receive first input data associated with current pixel indices of current pixels in a current block;
  receive second input data associated with reconstructed neighboring pixels inside a neighboring block of the current block;
  use predictor propagation to derive prediction of the current pixel indices based on neighboring pixel indices of the reconstructed neighboring pixels inside the neighboring block;
  assign a special index to the reconstructed neighboring pixels of the current block, and a coded first current pixel having the special index is reconstructed by directly copying from a pixel value of a corresponding reconstructed neighboring pixel of the current block or reconstructed neighboring pixel outside of the current block;
  encode or decode the current pixel indices based on the derived prediction; and
  provide encoded or decoded data of the current block.

* * * * *